UNITED STATES PATENT OFFICE.

EDUARD MÜNCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

SYNTHETIC PRODUCT RESEMBLING CAOUTCHOUC.

1,238,930.  Specification of Letters Patent.  Patented Sept. 4, 1917.

No Drawing.  Application filed September 26, 1913.  Serial No. 791,939.

*To all whom it may concern:*

Be it known that I, EDUARD MÜNCH, citizen of the German Empire, residing at Ludwigshafen-on-the-Rhine, Germany, have invented new and useful Improvements in Synthetic Products Resembling Caoutchouc, of which the following is a specification.

It is known that products resembling or related to caoutchouc obtained by polymerization of butadiene and homologues thereof often possess undesirable properties, for example they become resinous, melt together on being stored, and, on being worked up to form sheets, are with difficulty removed from the rollers.

I have now found that these objections can be overcome if the said products resembling or related to caoutchouc are heated at a temperature above 100° centigrade, but below that at which decomposition takes place while avoiding as far as possible the presence of air, and while allowing for the removal of volatile products which may be given off. I prefer to carry out the heating under reduced pressure, while an indifferent gas can be passed over or through the product. In some cases the simultaneous employment of nitrogen compounds, such for instance as ammonia, methylamin, anilin, amido acids, glue and albumen, is very advantageous; if these nitrogen compounds are gaseous or capable of being vaporized, they can be passed with or without an indifferent gas over the product to be treated, or if they are liquid or solid they can be mixed with the synthetic product before the operation is commenced.

When the heating is carried out at ordinary pressure or at a pressure above that of the atmosphere, an indifferent gas or vapor is preferably passed over or through the mass and, if desired, gaseous or vaporized nitrogen compounds, such for instance as ammonia, methylamin and anilin, can be used in addition to or instead of the indifferent gases, and further the liquid or solid nitrogen compounds, such for instance as amidoacids, glue or albumen, can be mixed with the products resembling or related to caoutchouc, if desired.

During the process according to my invention, some alteration of the structure of the compounds takes place. An outward sign of this alteration of structure consists in the fact that some of the physical properties are altered; thus, for instance, the solubility of the initial product in benzene differs from that of the final product.

The following examples will serve to illustrate further the nature of my invention and how it can be carried into practical effect, but the invention is not confined to these examples.

Example 1.

Place the dry synthetic product obtainable from isoprene according to the specification of British Patent No. 17,734/10 in a nickel vessel and heat, in an oil-bath, at a pressure of 40 millimeters, so that the temperature rises in 5 hours to about 140° C. Then heat for a further 3 hours at from 140° to 160° C.; a moderate current of ammonia is passed through the mass from the commencement of the operation until the mass is cold. In this way a light brown tough material is obtained which feels dry and can easily be worked on warm rollers and swells less easily in benzene than does the initial product.

Example 2.

Place the caoutchouc-like substance obtainable according to the specification of British Patent No. 22,454/11 in an enameled vessel connected with a second vessel containing hot ammonium sesqui-carbonate, and heat, gradually, in an oil-bath, to 180° C., maintaining this temperature for about 5 hours. During the reaction a pressure of from 30 to 40 millimeters should be obtained. The product obtained is of a light brown color and can be easily worked on warm rollers.

Example 3.

Mix intimately 20 parts of the substance resembling caoutchouc and obtainable from isoprene with 2 parts of powdered glue and then heat the mixture, under reduced pressure and preferably in a current of nitrogen, for a few hours, at 180° to 200° C. A product is obtained which possesses properties similar to those of the product obtained according to Example 1.

Example 4.

Place the caoutchouc-like substance freshly obtained from isoprene in a suitable vessel and reduce the pressure to about 20 millimeters. Then gradually heat, in an oil-bath, to from 180° to 200° C., while maintaining the reduced pressure. After about 6 hours the caoutchouc-like substance, which was previously sticky, is found to be converted into a product which remains dry on being stored and which can be easily worked.

Example 5.

Place in a vessel the polymerized product obtainable by heating 100 parts of isoprene with 3 parts of carvene ozonid, at 100° C., for about 14 days, and then, at slightly reduced pressure, pass a current of nitrogen through the vessel, and heat, in an oil-bath, to about 100° C., whereupon any unaltered isoprene distils off. Ammonia is then passed through the vessel, while reducing the pressure to from 20 to 30 millimeters and raising the temperature to from 180° to 190° C. After from 5 to 7 hours' heating a product is obtained which very closely resembles natural caoutchouc.

Example 6.

Place in a suitable vessel the polymerization product obtainable by shaking 100 parts of isoprene with 5 parts of sodium wire in a vessel in which the air has been replaced by carbon dioxid. Then heat the said polymerization product to from about 110° to 125° C., while maintaining a pressure of from 20 to 30 millimeters and passing a current of ammonia through the mass. The product, which is at first insoluble in benzene, becomes, after about 4 to 5 hours, soluble in benzene or it swells easily therein; after heating for several hours longer at from 170° to 190° C., a product is obtained finally which swells with difficulty in benzene and which more resembles natural caoutchouc.

Example 7.

Place in a vessel provided with a cooled receiver the product obtainable by heating 100 parts of isoprene with 3 parts of carvene ozonid at 100° C. for about 14 days, and then, while passing ammonia, or nitrogen, at ordinary pressure, through the vessel, raise the oil-bath in about 4 hours to 185° C. and maintain for 3 hours at this temperature. A product is obtained which feels dry and can be worked up on the warm rollers to a smooth amber colored sheet.

In a similar manner, other synthetic products resembling or related to caoutchouc can be treated, for instance those obtainable from butadiene, or homologues thereof, by polymerization with sodium at ordinary temperature and either with, or without, the addition of carbon dioxid, or the products obtained by autopolymerization as described by Kondakoff (*Journal für praktische Chemie*, 64, pp. 109–110).

If volatile products are given off upon heating, means must be adopted for their removal.

Now what I claim is:—

1. The process of improving synthetic products resembling or related to caoutchouc by heating them in a dry state at a temperature above 100° centigrade but below that at which decomposition takes place, while avoiding as far as possible the presence of air, and allowing for the removal of any volatile products given off and thereby causing an alteration in the structure of the initial materials.

2. The process of improving synthetic products resembling or related to caoutchouc by heating them under reduced pressure at a temperature above 100° centigrade but below that at which decomposition takes place, while avoiding as far as possible the presence of air, and allowing for the removal of any volatile products given off and thereby causing an alteration in the structure of the initial materials.

3. The process of improving synthetic products resembling or related to caoutchouc by heating them under reduced pressure in the presence of a suitable nitrogen compound at a temperature above 100° centigrade but below that at which decomposition takes place, while avoiding as far as possible the presence of air, and allowing for the removal of any volatile products given off and thereby causing an alteration in the structure of the initial materials.

4. The process of improving synthetic products resembling or related to caoutchouc by heating them under reduced pressure in the presence of ammonia, while maintaining a reduced pressure at a temperature above 100° centigrade but below that at which decomposition takes place, avoiding as far as possible the presence of air, and allowing for the removal of any volatile products given off and thereby causing an alteration in the structure of the initial materials.

In testimony whereof I have hereunto set my hand in the presence of two subscribing witnesses.

EDUARD MÜNCH.

Witnesses:
J. Alec Lloyd,
Joseph Pfeiffer.